(12) United States Patent
Iinuma

(10) Patent No.: US 9,998,645 B2
(45) Date of Patent: Jun. 12, 2018

(54) TELECOMMUNICATION UNIT THAT ENABLES COMMUNICATION BETWEEN IMAGE PICKUP APPARATUS AND INTERCHANGEABLE LENS, AS WELL AS LENS ADAPTER

(71) Applicant: CANON KABUSHIKI KAISHA, Tokyo (JP)

(72) Inventor: Futoshi Iinuma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/082,544

(22) Filed: Mar. 28, 2016

(65) Prior Publication Data

US 2016/0295083 A1    Oct. 6, 2016

(30) Foreign Application Priority Data

Mar. 31, 2015 (JP) .................................. 2015-071986

(51) Int. Cl.
*H04N 5/225* (2006.01)
*G03B 17/14* (2006.01)

(52) U.S. Cl.
CPC .......... *H04N 5/2254* (2013.01); *G03B 17/14* (2013.01)

(58) Field of Classification Search
CPC ........................... H04N 5/23209; G03B 17/14
(Continued)

(56) References Cited

U.S. PATENT DOCUMENTS

2004/0252991 A1* 12/2004 Kawai .................... G02B 7/14
396/529
2005/0025472 A1* 2/2005 Sugita .................. G03B 17/565
396/71
(Continued)

FOREIGN PATENT DOCUMENTS

EP          2725418 A1    4/2014
JP          11-218827 A   8/1999

OTHER PUBLICATIONS

"Pentax-DA Rear Converter 1.4x: First Impressions", Mar. 12, 2014, pp. 1-5.; http://www.pentaxforums.com/articles/hands-on-reviews/the-new-rear-converter-14x.html.
(Continued)

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

A telecommunication unit which ensures high reliability of electric connection with a simple structure and enables satisfactory communication between an apparatus main body of an image pickup apparatus and an interchangeable lens. A first electric connecting unit has contact portions that are electrically connected to the interchangeable lens when the interchangeable lens is mounted on the lens adapter. A second electric connecting unit has contact portions that are electrically connected to the apparatus main body when the lens adapter is fixed to the apparatus main body. The contact portions of the first electric connecting unit are arranged in the form of an arc with an optical axis of the interchangeable lens at its center. The contact portions of the second electric connecting unit are arranged in a linear fashion in a width direction of the apparatus main body perpendicular to the optical axis of the interchangeable lens.

8 Claims, 15 Drawing Sheets

(58) Field of Classification Search
USPC .......................................................... 348/335
See application file for complete search history.

(56) References Cited

U.S. PATENT DOCUMENTS

| | | | |
|---|---|---|---|
| 2007/0077062 A1* | 4/2007 | Senba .................... | G03B 17/14 |
| | | | 396/529 |
| 2008/0304818 A1* | 12/2008 | Kranz ...................... | G02B 7/14 |
| | | | 396/310 |
| 2010/0111517 A1 | 5/2010 | Yasuda | |
| 2011/0013902 A1* | 1/2011 | Kim ....................... | G02B 7/026 |
| | | | 396/530 |

OTHER PUBLICATIONS

The above patent documents were cited in a European Search Report dated Jul. 28, 2016, which is enclosed, that issued in the corresponding European Patent Application No. 16162750.0.

* cited by examiner

TELECOMMUNICATION UNIT THAT ENABLES COMMUNICATION BETWEEN IMAGE PICKUP APPARATUS AND INTERCHANGEABLE LENS, AS WELL AS LENS ADAPTER

BACKGROUND OF THE INVENTION

Field of the Invention

The present invention relates to improvements in a telecommunication unit provided in a lens adapter for an interchangeable lens removably mounted on an apparatus main body of an image pickup apparatus such as a digital camera.

Description of the Related Art

In an interchangeable lens camera, when an interchangeable lens with a lens mount having a different shape from that of a lens mount of a camera main body is to be mounted on the camera main body, the interchangeable lens is removably mounted on the lens mount of the camera main body via a lens adapter. The lens adapter is often equipped with a telecommunication unit so as to enable communication between the interchangeable lens and the camera main body.

When the lens adapter having the telecommunication unit may not be used due to interference of the telecommunication unit when no electric connecting portion for the telecommunication unit is provided in the interchangeable lens or the camera main body.

Thus, there has been proposed a technique to, when mounting an interchangeable lens and a camera to each other at a mating surface, push a contact portion of a movable connector by a contact pin of a fixed connector so as to move the movable connector to the mating surface. According to this proposal, the movable connector that has moved to the mating surface is held in a state of being pushed back by such an appropriate force as to prevent disconnection of the electric contact due to urging force of a spring (see Japanese Laid-Open Patent Publication (Kokai) No. H11-218827).

According to Japanese Laid-Open Patent Publication (Kokai) No. H11-218827, however, a moving mechanism, a spring, and so forth for the connectors are needed, and this complicates a structure to cause poor electric conduction and may degrade reliability of electric connection.

SUMMARY OF THE INVENTION

The present invention provides a telecommunication unit and a lens adapter which ensure high reliability of electric connection with a simple structure and enables satisfactory communication between an apparatus main body of an image pickup apparatus and an interchangeable lens.

Accordingly, the present invention provides a telecommunication unit that is removably fixed to an apparatus main body of an image pickup apparatus and provided in a lens adapter, on which an interchangeable lens is removably mounted, to enable communication between the apparatus main body and the interchangeable lens, comprising a first electric connecting unit configured to have a plurality of contact portions that are electrically connected to the interchangeable lens in response to the interchangeable lens being mounted on the lens adapter, and a second electric connecting unit configured to have a plurality of contact portions that are electrically connected to the apparatus main body in response to the lens adapter being fixed to the apparatus main body, wherein the plurality of contact portions of the first electric connecting unit is arranged in a form of an arc with an optical axis of the interchangeable lens at a center, and wherein the plurality of contact portions of the second electric connecting unit is arranged in a linear fashion in a width direction of the apparatus main body which is perpendicular to the optical axis of the interchangeable lens.

According to the present invention, the telecommunication unit ensures high reliability of electric connection with a simple structure.

Further features of the present invention will become apparent from the following description of exemplary embodiments (with reference to the attached drawings).

DESCRIPTION OF THE EMBODIMENTS

Hereafter, an exemplary embodiment of the present invention will be described with reference to the drawings.

Figure 1:
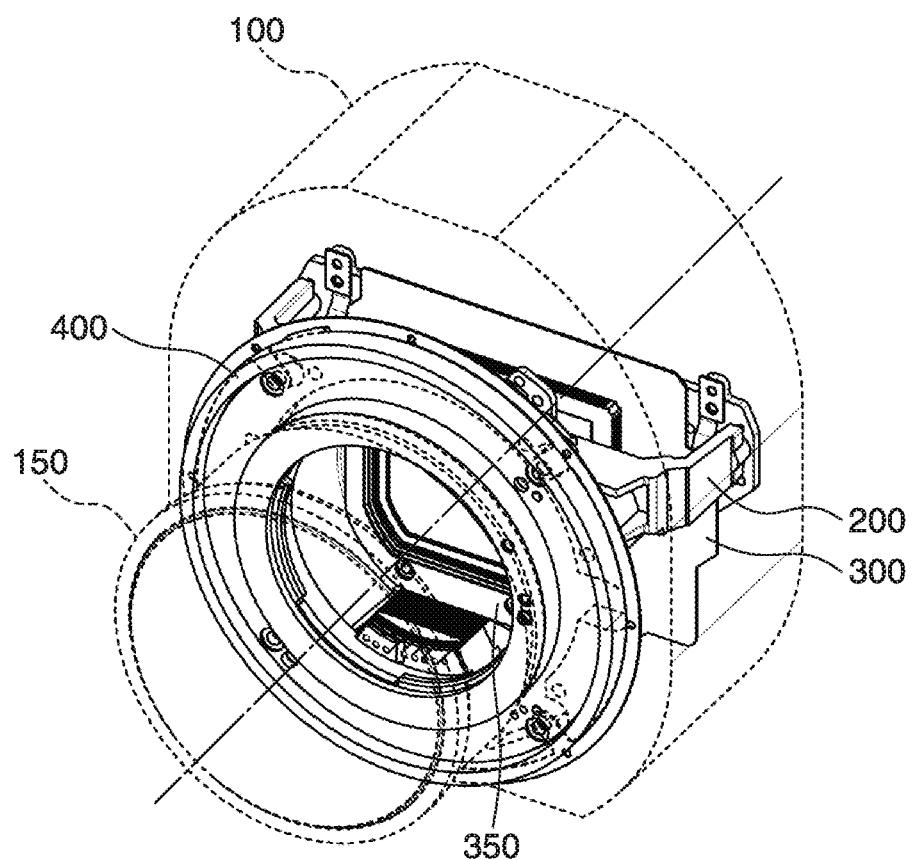
FIG. 1 is a perspective view showing a digital camera with an interchangeable lens removably mounted on a camera main body via a lens adapter having a telecommunication unit which is an exemplary embodiment of the present invention as viewed from the front (subject side).

FIG. 1 is a perspective view showing a digital camera with an interchangeable lens removably mounted on a camera main body via a lens adapter having a telecommunication unit which is an exemplary embodiment of the present invention as viewed from the front (subject side). It should be noted that in FIG. 1, the camera main body 100 and the interchangeable lens 150 of the digital camera are indicated by broken lines for convenience of explanation. Also, in the present embodiment, the camera main body of the digital camera is used as an example of an apparatus main body of an image pickup apparatus, but the apparatus main body is not limited to this.

As shown in FIG. 1, the interchangeable lens 150 is removably mounted on a front side of the camera main body 100 of the digital camera via the lens adapter 400. The camera main body 100 is equipped with an image pickup device unit 300, an image pickup device protection unit 350, and a fixing unit 200.

Figure 2:
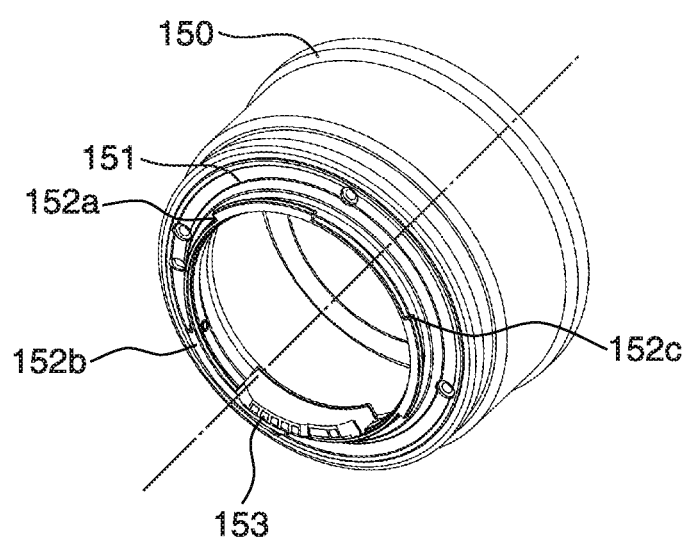
FIG. 2 is a perspective view showing the interchangeable lens as viewed from behind.

FIG. 2 is a perspective view showing the interchangeable lens 150 as viewed from behind (a side on which the interchangeable lens 150 is mounted on the camera main body 100). As shown in FIG. 2, a mounting unit 151 is provided on a rear side of the interchangeable lens 150, and locking claw portions 152a to 152c are provided at substantially regular intervals in a circumferential direction inside the mounting unit 151 in a radial direction. An electric connecting portion 153 is provided between the locking claw portion 152b and the locking claw portion 152c on the rear side of the interchangeable lens 150.

Figure 3A:
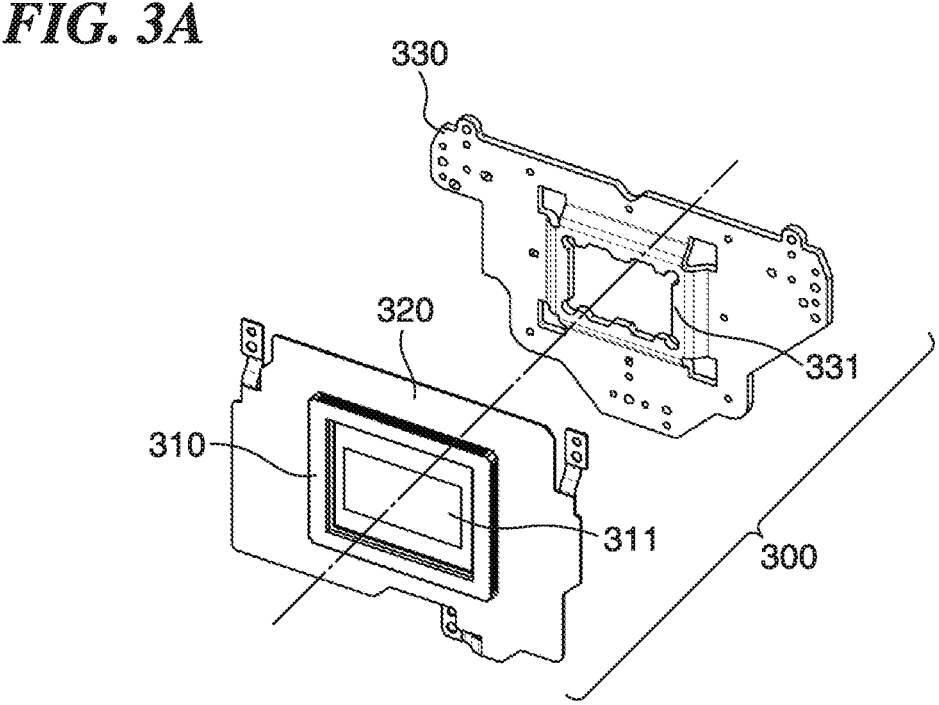
FIG. 3A is an exploded perspective view showing an image pickup device unit as viewed from the front.
Figure 3B:
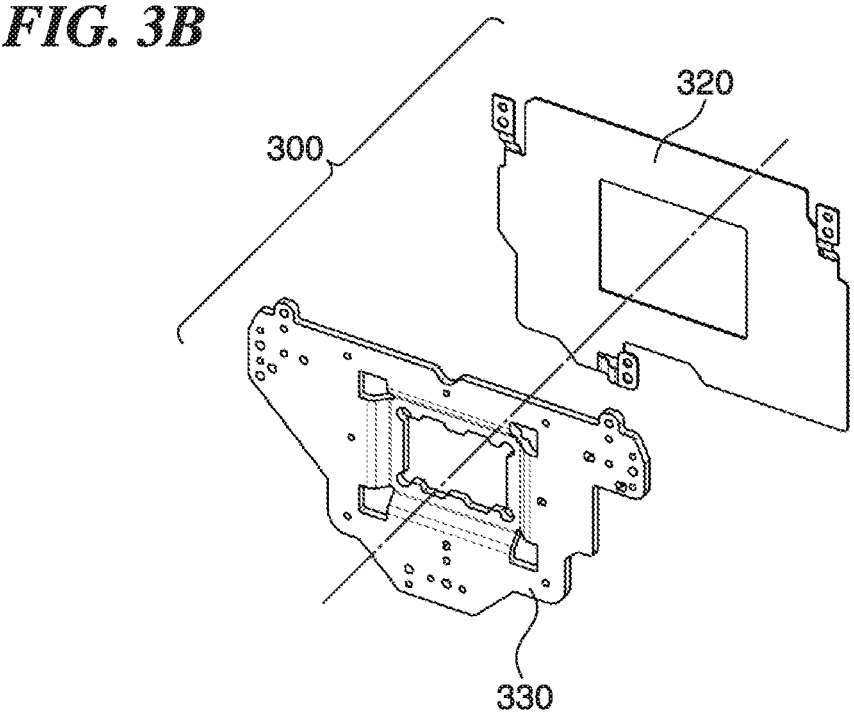
FIG. 3B is an exploded perspective view showing the image pickup device unit in FIG. 3A as viewed from behind.

FIG. 3A is an exploded perspective view showing the image pickup device unit 300 as viewed from the front, and FIG. 3B is an exploded perspective view showing the image pickup device unit 300 in FIG. 3A as viewed from behind. As shown in FIGS. 3A and 3B, the image pickup device unit 300 has a device substrate 320 on which the image pickup device 310 is mounted, and a holding member 330 which holds the image pickup device 310 mounted on the device substrate 320.

The image pickup device 310 photoelectrically converts a subject image, which has been formed on a light-incident surface 311 through the interchangeable lens 150, and outputs an image signal. The device substrate 320 carries out a predetermined process on the image signal output from the image pickup device 310 and outputs the image signal to a main substrate, not shown. A fixing portion 331 is provided in a middle part of the holding member 330, and the image pickup device 310 mounted on the device substrate 320 is fixed to the fixing portion 331 by bonding or the like.

Figure 4A:
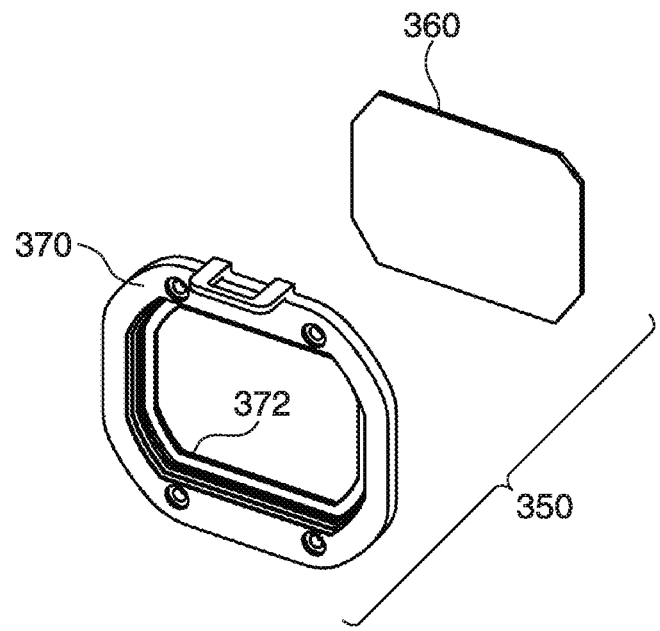
FIG. 4A is an exploded perspective view showing an image pickup device protection unit as viewed from the front.
Figure 4B:
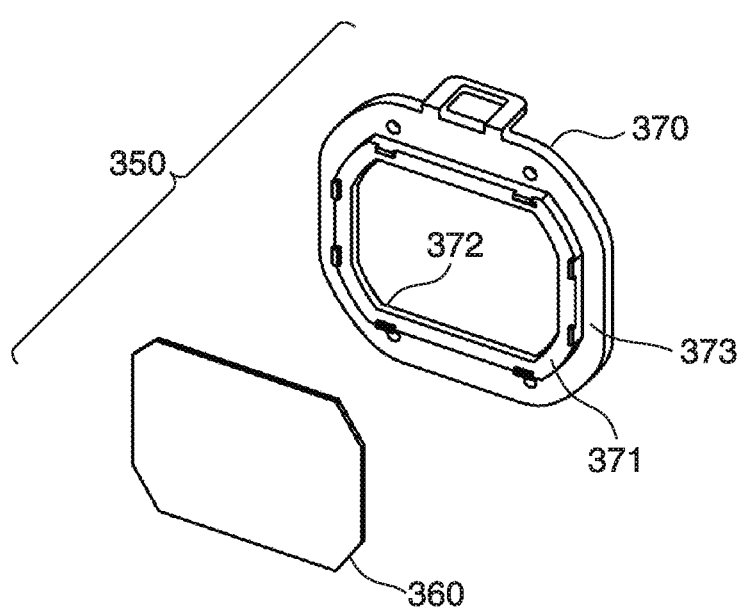
FIG. 4B is an exploded perspective view showing the image pickup device protection unit in FIG. 4A as viewed from behind.

FIG. 4A is an exploded perspective view showing the image pickup device protection unit 350 as viewed from the front, and FIG. 4B is an exploded perspective view showing the image pickup device protection unit 350 in FIG. 4A as viewed from behind. The image pickup device protection unit 350 is disposed between the lens adapter 400 and the image pickup device unit 300, and as shown in FIGS. 4A and 4B, has a substantially rectangular holding member 370 with an exposure opening 372 formed in a middle part thereof. On a rear side of the holding member 370, a fixing portion 371 which projects toward the image pickup device 310 is provided around the exposure opening 372, and a glass member 360 is fixed to the fixing portion 371 using a double-faced tape or the like. A contact portion 373, which is brought into surface-contact with the fixing unit 200, is provided on a surface around the fixing portion 371 of the holding member 370.

Figure 5A:
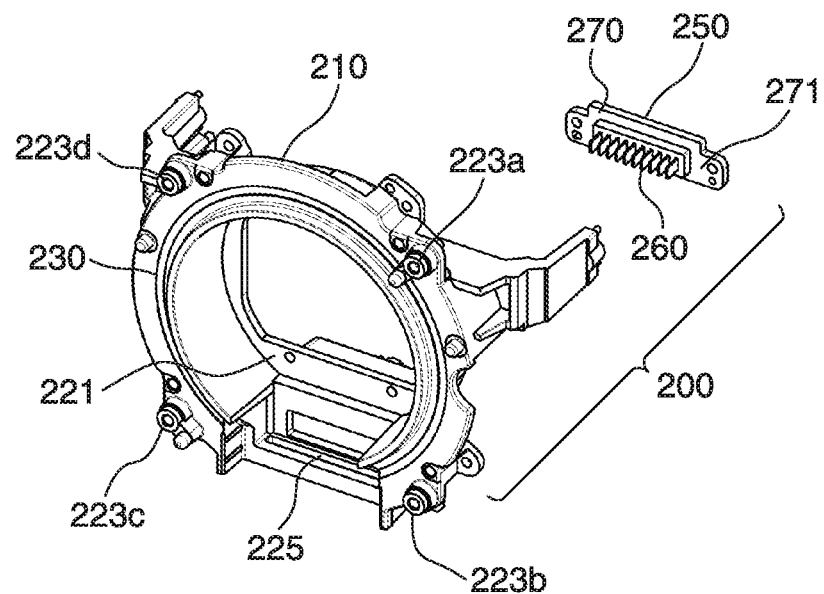
FIG. 5A is an exploded perspective view showing a fixing unit as viewed from the front.
Figure 5B:
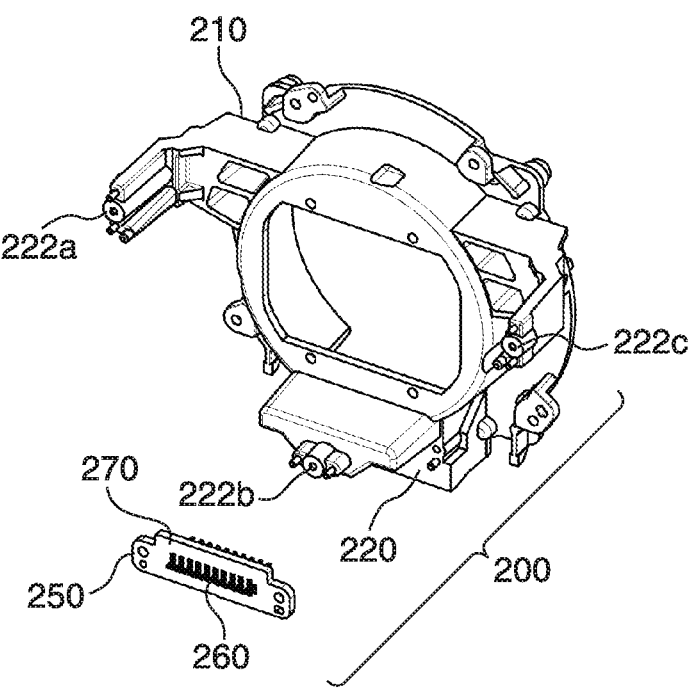
FIG. 5B is an exploded perspective view showing the fixing unit in FIG. 5A as viewed from behind.
Figure 6:
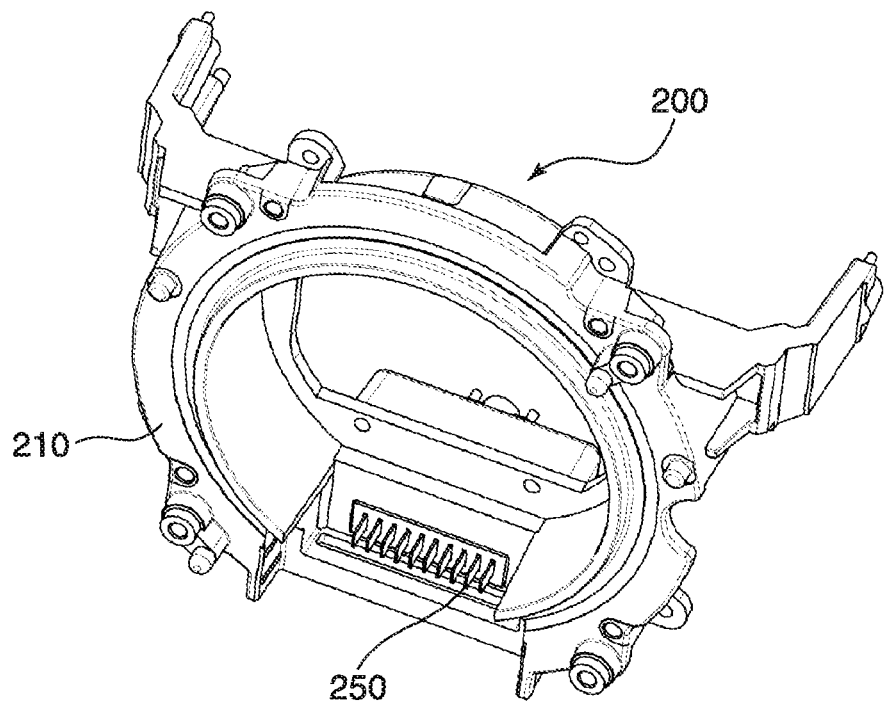
FIG. 6 is a perspective view showing an assembly of the fixing unit in FIG. 5A.
Figure 7A:
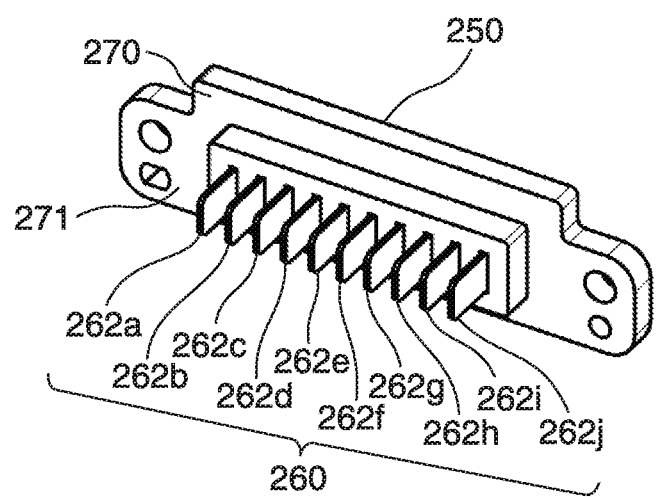
FIG. 7A is a perspective view showing a telecommunication unit constituting the fixing unit as viewed from the front.
Figure 7B:
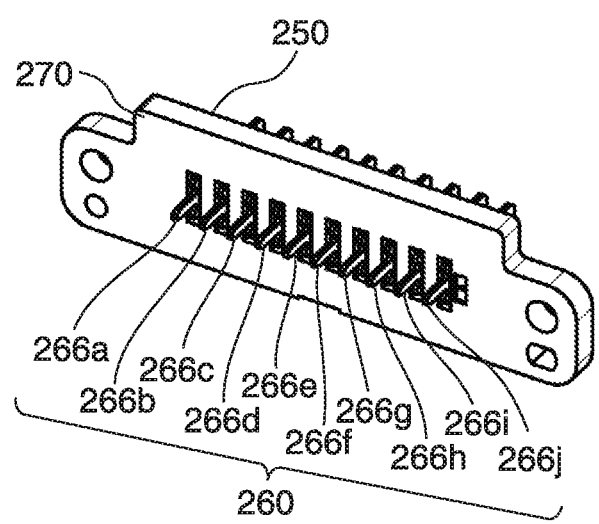
FIG. 7B is a perspective view showing the telecommunication unit in FIG. 7A as viewed from behind.

FIG. 5A is an exploded perspective view showing the fixing unit 200 as viewed from the front, and FIG. 5B is an exploded perspective view showing the fixing unit 200 in FIG. 5A as viewed from behind. FIG. 6 is a perspective view showing an assembly of the fixing unit 200 in FIG. 5A. FIG. 7A is a perspective view showing the telecommunication unit 250 constituting the fixing unit 200 as viewed from front, and FIG. 7B is a perspective view showing the telecommunication unit 250 in FIG. 7A as viewed from behind.

As shown in FIGS. 5A to 6, the fixing unit 200 has a substantially annular fixing member 210. As shown in FIG. 5A, a fixing portion 221 to which the image pickup device protection unit 350 is fixed, and fixing portions 223a to 223d to which the lens adapter 400 is fixed are provided on a front side of the fixing member 210. Also, on the front side of the fixing member 210, a contact portion 230 with which a ring-shaped elastic member 490 (see FIGS. 8A and 8B), to be described later, of the lens adapter 400 is brought into contact in a direction of an optical axis is provided, and in a bottom portion of the fixing member 210, an air hole 225 is formed.

The contact portion 373 provided in the holding member 370 of the image pickup device protection unit 350 is brought into surface-contact with the fixing portion 221. This seals a joint of the members and prevents foreign matter such as dust from entering the image pickup device unit 300 through the joint of the members.

On the other hand, as shown in FIG. 5B, a fixing portion 220 to which the telecommunication unit 250 is fixed, and fixing portions 222a to 222c to which the image pickup device unit 300 is fixed are provided on a rear side of the fixing member 210. The telecommunication unit 250 has a holding member 270 which holds a terminal member 260.

A contact portion 271 provided in the holding member 270 of the telecommunication unit 250 is brought into surface-contact with the fixing portion 220. This seals a joint of the members and prevents foreign matter such as dust from entering the image pickup device unit 300 from the joint of the members. The terminal member 260 is formed in the holding member 270 by insert molding to obtain a sealed structure which prevents entry of foreign matter such as dust from between the holding member 270 and the terminal member 260.

The terminal member 260 has contact portions 262a to 262j comprised of a plurality of plate-shaped terminals, and contact portions 266a to 266j comprised of a plurality of pin-shaped terminals. The contact portions 262a to 262j are projected toward the lens adapter 400, and the contact portions 266a to 266j are projected toward the image pickup device 310. The plurality of contact portions 262a to 262j are disposed on a bottom side of the camera main body 100 and form male terminals having a comb teeth shape linearly arranged side by side with their respective plate surfaces opposed to each other in a width direction of the camera main body 100 perpendicular to an optical axis.

The fixing portions 222a to 222c are fixed to the image pickup device unit 300 via a spacer, not shown. The spacer sandwiched between the fixing portions 222a to 222c and the image pickup device unit 300 enables adjustment of the flange back length. The flange back length, which is prescribed for each type of lens adapters, means a distance from a mount portion 411 (see FIG. 8A) of a fixed mount member 410, to be described later, to the light-incident surface 311 of the image pickup device 310 of the image pickup device unit 300.

Figure 8A:
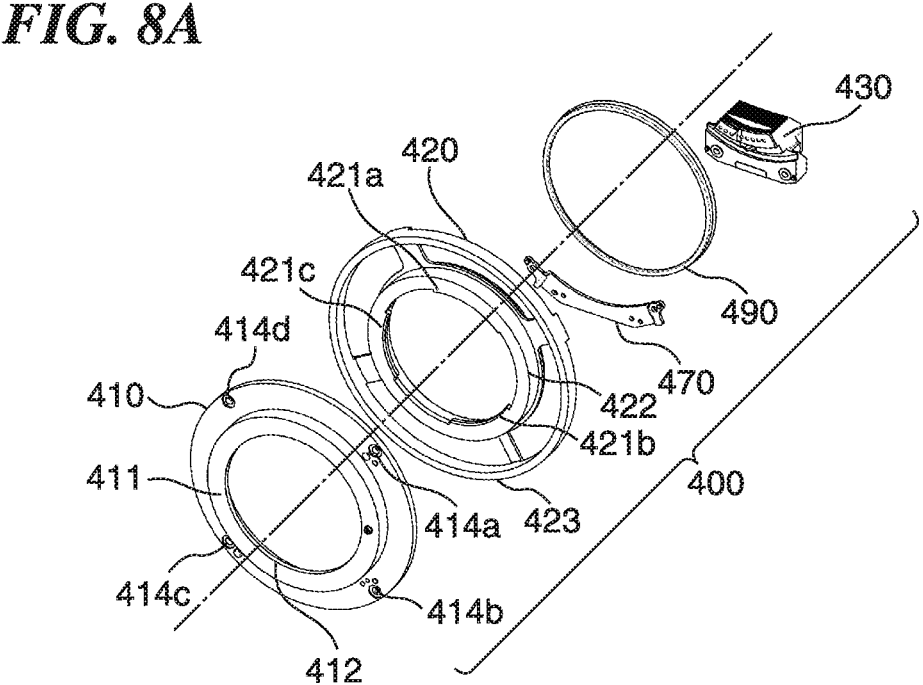
FIG. 8A is an exploded perspective view showing the lens adapter, which is an exemplary embodiment of the present invention, as viewed from the front.
Figure 8B:
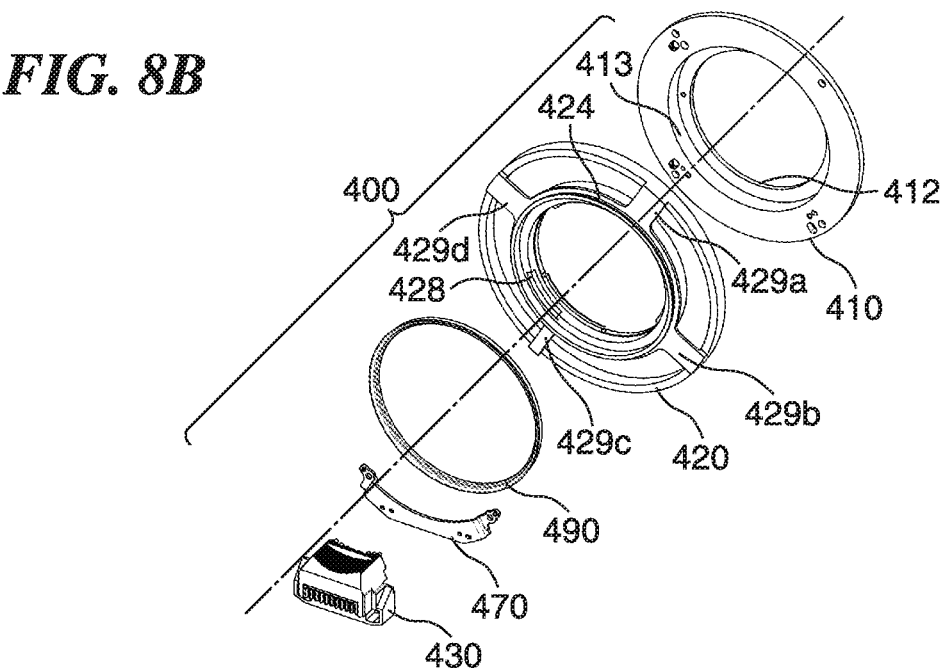
FIG. 8B is an exploded perspective view showing the lens adapter in FIG. 8A as viewed from behind.

FIG. 8A is an exploded perspective view showing the lens adapter 400, which is an exemplary embodiment of the present invention, as viewed from the front, and FIG. 8B is an exploded perspective view showing the lens adapter 400 in FIG. 8A as viewed from behind. As shown in FIGS. 8A and 8B, the lens adapter 400 has the fixed mount member 410, a movable mount member 420, a telecommunication unit 430, a holding member 470, and the elastic member 490.

As shown in FIG. 8A, the locking claw portions 152a to 152c of the interchangeable lens 150 are inserted into a central opening 412 of the fixed mount member 410. The mount portion 411 with an annular shape which projects toward the front is provided around the central opening 412 on a front side of the fixed mount member 410, and the mount portion 411 abuts against the mount portion 151 of the interchangeable lens 150 in a direction of the optical axis.

Screw insertion holes 414a to 414d are formed at substantially regular intervals in a circumferential direction outside the mount portion 411 of the fixed mount member 410 in a radial direction. As shown in FIG. 8B, an inner peripheral portion of the fixed mount member 410 on a rear side thereof has a larger diameter than that of the central opening 412, and a female thread portion 413 is formed on the inner peripheral portion.

As shown in FIG. 8A, the movable mount member 420 is disposed on a rear side of the fixed mount member 410 and has a cylindrical male thread portion 422 which is engaged with the female thread portion 413 of the fixed mount member 410.

On an inner peripheral portion of the male thread portion 422 on a front side thereof, locking claw portions 421a to 421c, which are removably engaged with the locking claw portions 152a to 152c of the interchangeable lens 150 in a rotational direction, are provided at substantially regular intervals in a circumferential direction. On an outer peripheral portion of the male thread portion 422 on a rear side thereof, arm portions 429a to 429d projecting outwardly in a radial direction are provided at substantially regular intervals in a circumferential direction, and the arm portions 429a to 429d are connected to an annular operating portion 423 which is disposed outside the male thread portion 422 in a radial direction and substantially coaxial with the male thread portion 422.

As shown in FIG. 8B, on a rear side of the male thread portion 422, an annular contact portion 424 on which the elastic member 490 is to be fitted is provided in a manner projecting toward the rear, and a detecting concave portion 428 is provided on an inner peripheral portion of the male thread portion 422 on the rear side thereof.

To fix the interchangeable lens 150 on the lens adapter 400, the operating portion 423 of the movable mount member 420 is rotated with the mount portion 151 of the interchangeable lens 150 held in abutment with the mount portion 411 of the fixed mount member 410. At this time, the locking claw portions 421a to 421c of the movable mount member 420 are engaged with the locking claw portions 152a to 152c of the interchangeable lens 150 in a rotational direction. As a result, the interchangeable lens 150 is drawn toward the image pickup device unit 300 and removably mounted on the lens adapter 400.

Figure 9A:
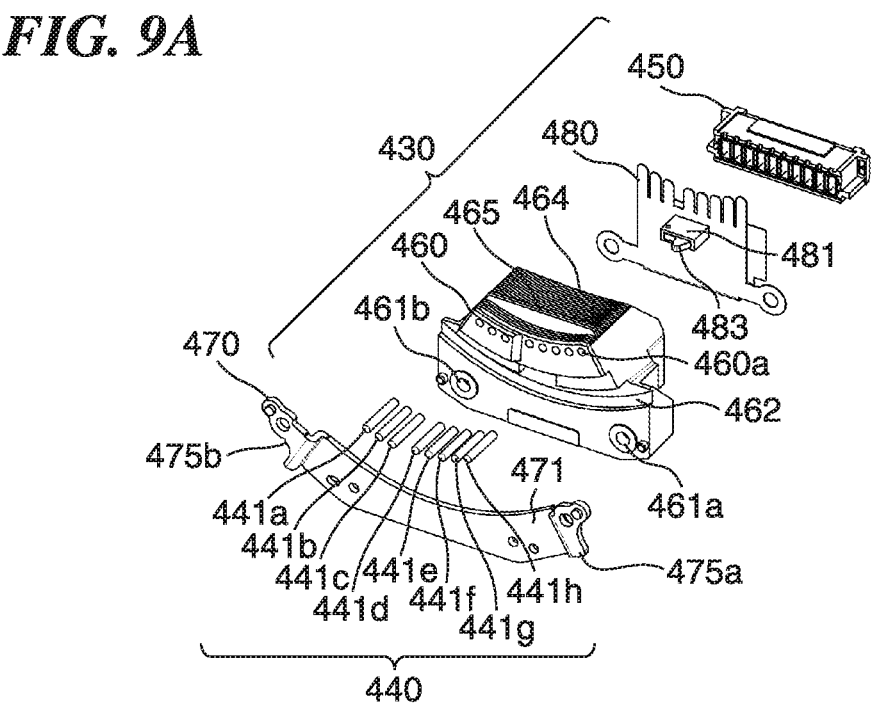
FIG. 9A is an exploded perspective view showing the telecommunication unit and a holding member of the lens adapter as viewed from the front.
Figure 9B:
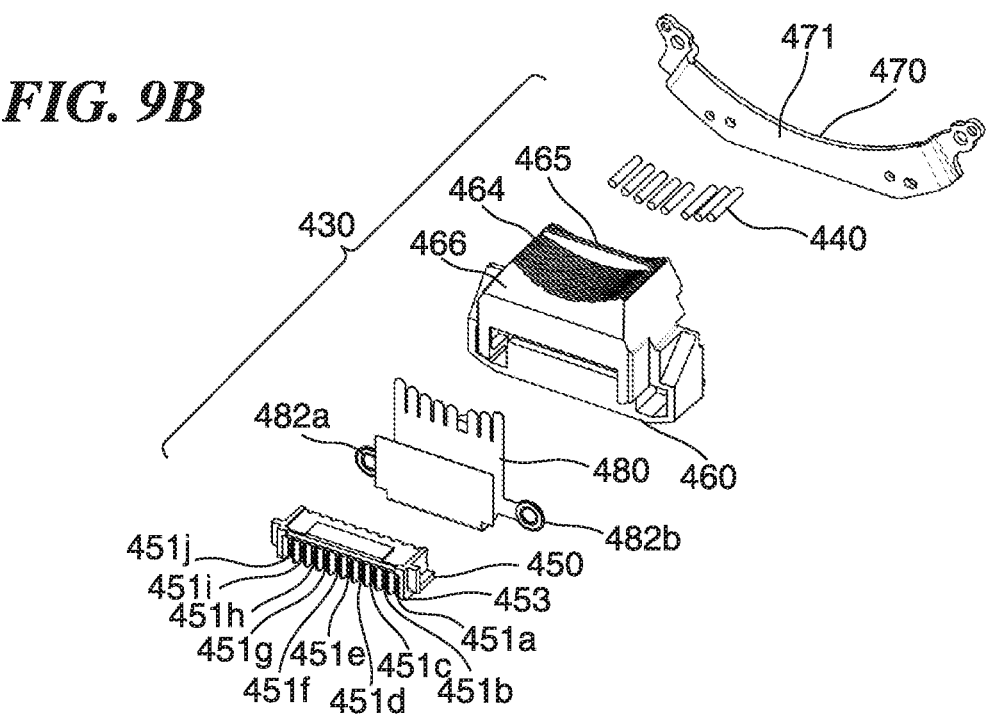
FIG. 9B is an exploded perspective view showing the telecommunication unit and the holding member in FIG. 9A as viewed from behind.

FIG. 9A is an exploded perspective view showing the telecommunication unit 430 and the holding member 470 of the lens adapter 400 as viewed from the front, and FIG. 9B is an exploded perspective view showing the telecommunication unit 430 and the holding member 470 in FIG. 9A as viewed from behind.

As shown in FIGS. 9A and 9B, the telecommunication unit 430 has electric connecting portions 440 and 450, a supporting member 460 which supports the electric connecting portion 440, and a flexible substrate 480 which electrically connects the electric connecting portion 440 and the electric connecting portion 450 together, and is held by the holding member 470. The electric connecting portion 440 corresponds to an exemplary first electric connecting portion of the present invention, and the electric connecting portion 450 corresponds to an exemplary second electric connecting portion of the present invention.

The holding member 470 has a fixing portion 471 to which the telecommunication unit 430 is fixed, and arm portions 475a and 475b which are fixed to the fixed mount member 410. The electric connecting portion 440 is electrically connected to the electric connecting portion 153 of the interchangeable lens 150, and the electric connecting portion 450 is electrically connected to the contact portions 262a to 262j constituting the terminal member 260 of the telecommunication unit 250.

The electric connecting portion 440 has a pin-shaped contact portions 441a to 441h. The contact portions 441a to 441h are supported movably in the direction of the optical axis by a plurality of supporting holes 460a, which are formed in the supporting member 460 on a front side thereof, while being urged toward the interchangeable lens 150 by an urging member, not shown. The plurality of supporting holes 460a is arranged in the form of an arc with the optical axis at its center.

On a wall portion under the plurality of supporting holes 460a on the front side of the supporting member 460, a contacting portion 462 with which the elastic member 490 comes into contact is provided, and as with the plurality of supporting holes 460a, the contacting portion 462 is provided in the form of an arc with the optical axis at its center. Screw insertion holes 461a and 461b are formed on both sides under the contacting portion 462 of the supporting member 460.

An arc concave portion 464, which is formed in the form of an arc with the optical axis at its center, is provided on an upper surface of the supporting member 460. A shielding wall portion 465 is provided in a standing manner on a front side of the arc concave portion 464 of the supporting member 460, and a cutaway portion 466 tilted diagonally downward is provided on a rear side of the arc concave portion 464. The shielding wall portion 465 is perpendicular to the optical axis and projected in a horizontal direction of the camera main body 100.

Subject light incident from the interchangeable lens 150 may be reflected by a member disposed between the interchangeable lens 150 and the image pickup device unit 300 to unexpectedly appear in a photographic image. This reflected light is preferably reduced to the extent possible. In the present embodiment, uneven light-shielding lines are formed on a surface of the arc concave portion 464, and light that falls on those uneven light-shielding lines is diffused. This prevents undesired light from unexpectedly appearing in a photographic image.

Also, subject light incident from the interchangeable lens 150 is gathered to become more intense as it comes close to the image pickup device 310 of the image pickup device unit 300. Thus, by diffusing weak light in the vicinity of the lens adapter 400 before light is gathered on the image pickup device 310, undesired light is less likely to unexpectedly appear in a photographic image. In the present embodiment, the light-shielding wall portion 465 is provided in the vicinity of the lens adapter 400, and an end (upper end) of the light-shielding wall portion 465 has a convex shape. Thus, weak light which is part of subject light is diffused before it is gathered on the image pickup device 310, and hence undesired light is prevented from unexpectedly appearing in a photographic image.

A mechanical switch 481 is mounted in a middle part of the flexible substrate 480 on a front side thereof. The mechanical switch 481 has a switch portion 483, and when the switch portion 483 is depressed, telecommunication between the interchangeable lens 150 and the camera main body 100 is selectively turned on or off. In the present embodiment, when the switch portion 483 is depressed, telecommunication between the interchangeable lens 150 and the camera main body 100 is turned on. On both sides of the flexible substrate 480, pattern exposed portions 482a and 482b are provided correspondingly to screw insertion holes 461a and 461b of the supporting member 460. The pattern exposed portions 482a and 482b are placed around the screw insertion holes 461a and 461b, respectively.

Figure 10A:
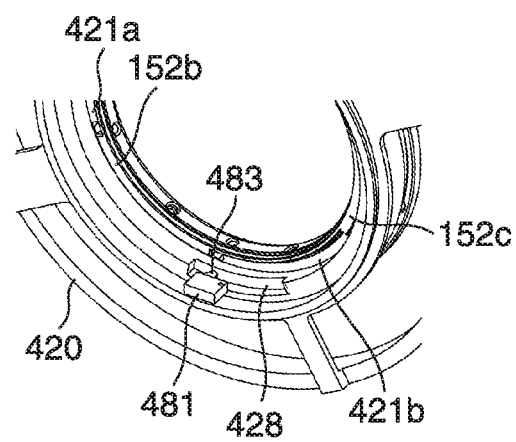
FIGS. 10A to 10C are partial perspective views useful in explaining how a mechanical switch operates when the interchangeable lens is mounted on the lens adapter.
Figure 10B:
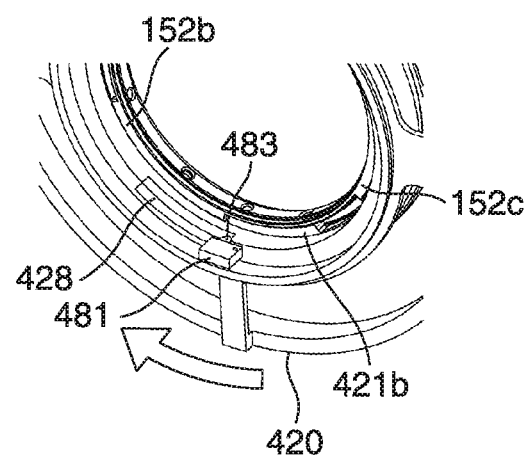
Figure 10C:
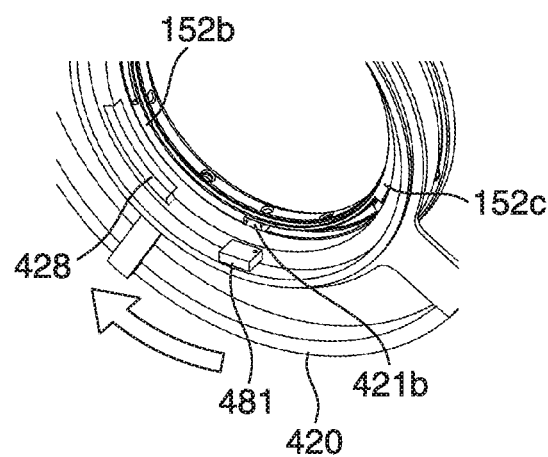

Referring next to FIGS. 10A to 10C, the mechanical switch 481 will be given described in further detail. When power is supplied in an unstable state in which it is uncertain whether or not the electric connecting portion 153 of the interchangeable lens 150 and the electric connecting portion 440 of the lens adapter 400 on the interchangeable lens 150 side are in contact with each other, poor telecommunication occurs, and a malfunction may occur when the interchangeable lens 150 is operated. To prevent this, a mechanism for detecting that the electric connecting portions have been brought into solid contact with each other and thereafter supplying power is needed.

FIGS. 10A to 10C are partial perspective views showing how the mechanical switch 481 operates when the interchangeable lens 150 is mounted on the lens adapter 400 as viewed from behind the camera main body 100.

FIG. 10A is a partial perspective view showing a state before the interchangeable lens 150 is mounted on the lens adapter 400. In the state shown in FIG. 10A, the mechanical switch 481 is placed in a manner overlapping the detecting concave portion 428 of the movable mount member 420 in terms of optical axial projection, and the switch portion 483 is positioned within the detecting concave portion 428 and not depressed. At this time, telecommunication is off, and hence telecommunication is not carried out between the interchangeable lens 150 and the camera main body 100.

FIG. 10B is a partial perspective view showing a state immediately before the mechanical switch 481 is pushed down by the movable mount member 420. In the state shown in FIG. 10B, the movable mount member 420 is rotated in a direction indicated by an arrow in the figure, and the interchangeable lens 150 is mounted on the movable mount member 420, but as with FIG. 10A, the switch portion 483 is not depressed.

The locking claw portions 421a to 421c of the movable mount member 420 and the locking claw portions 152a to 152c of the interchangeable lens 150 are engaged with each other in an overlapping manner, and hence the interchangeable lens 150 never comes off the lens adapter 400. On this occasion, the electric connecting portion 153 of the interchangeable lens 150 and the electric connecting portion 440 of the lens adapter 400 on the interchangeable lens 150 side are in solid contact with each other. After that, the movable mount member 420 is further rotated in the direction indicated by the arrow in the figure to depress the switch portion 483.

FIG. 10C is a partial perspective view showing a state in which the switch portion 483 of the mechanical switch 481 is moved away in a circumferential direction from the detecting concave portion 428 of the movable mount member 420 and depressed by the movable mount member 420. In the state shown in FIG. 10C, the switch portion 483 is depressed to turn on telecommunication, and hence telecommunication is allowed to be carried out between the interchangeable lens 150 and the camera main body 100. Thus, poor telecommunication is prevented by selectively turning on and off telecommunication between the interchangeable lens 150 and the camera main body 100 using the mechanical switch 481 and the detecting concave portion 428.

Figure 11:
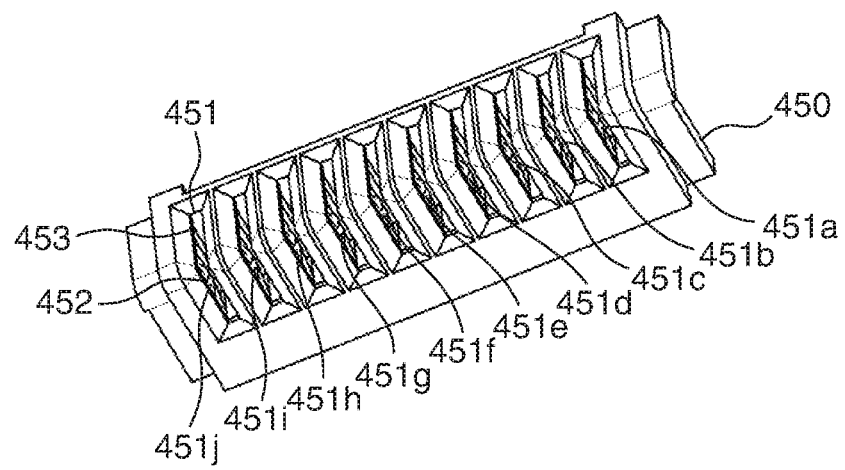
FIG. 11 is a perspective view showing an electric connecting portion of the telecommunication unit as viewed from below and behind.
Figure 12:
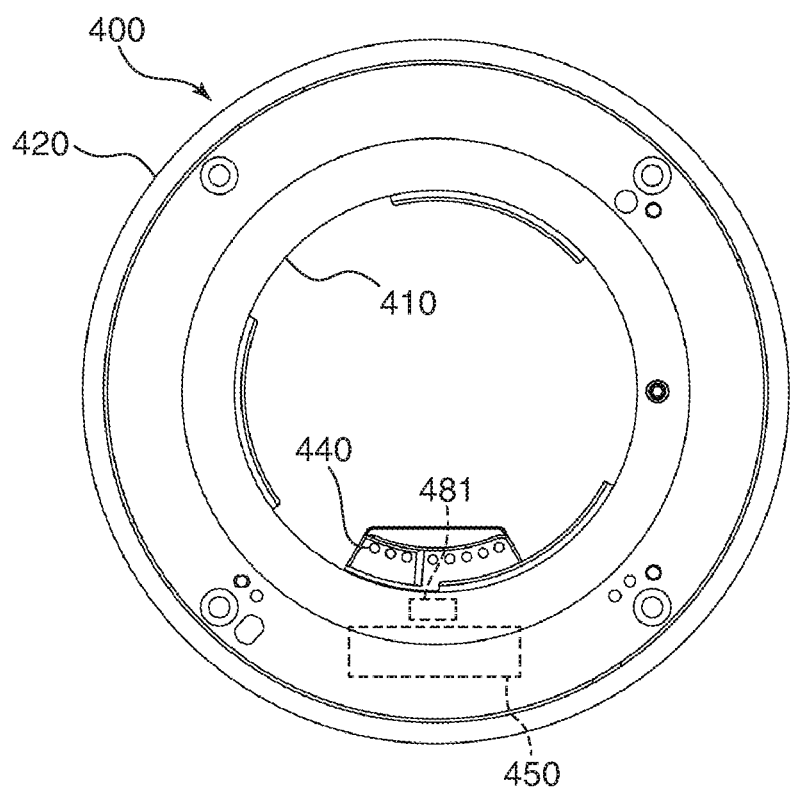
FIG. 12 is a view showing the lens adapter as viewed in a direction of an optical axis from the front.

FIG. 11 is a perspective view showing the electric connecting portion 450 of the telecommunication unit 430 as viewed from below and behind. FIG. 12 is a view showing the lens adapter 400 as viewed in the direction of the optical axis from the front.

As shown in FIG. 11, the electric connecting portion 450 has a plurality of openings 451, and in the plurality of openings 451, respective contact portions 451a to 451j are provided for the contact portions 262a to 262j constituting the telecommunication unit 250 of the fixing unit 200. The contact portions 451a to 451j are female terminals shaped like comb teeth for the contact portions 262a to 262j which are male terminals shaped like comb teeth.

The openings 451 are comprised of bottom-side openings 452 and rear-side openings 453, and the bottom-side openings 452 are opened to a bottom surface of the camera main body 100, and on a rear side of the camera main body 100, the rear-side openings 453 are opened contiguously with the bottom-side openings 452.

As shown in FIG. 12, the electric connecting portion 450 on the camera main body 100 side (the fixing unit 200 side) is placed outside the electric connecting portion 440 on the interchangeable lens 150 side in a radial direction. Because of this layout, the electric connecting portion 450 is covered with the fixed mount member 410 and the telecommunication unit 250 of the fixing unit 200 in terms of optical axis projection.

For this reason, the electric connecting portion 450 is never accidentally touched, and hence an electric contact surface is prevented from becoming dirty, and stable telecommunication becomes possible. Moreover, even when the lens adapter 400 according to the present embodiment is replaced by a lens adapter that requires a larger opening than that of the lens adapter 400, the electric connecting portion 450 is less likely to become exposed in terms of optical axis projection, and as described above, stable telecommunication becomes possible.

The mechanical switch 481 described above is disposed in a manner overlapping the fixing mount member 410 and the movable mount member 420 of the lens adapter 400 in terms of optical axis projection. Because of this layout, the mechanical switch 481 is never accidentally touched, and breakage or the like of the mechanical switch 481 is prevented. It should be noted that in the present embodiment, a contact-type mechanical switch is taken as an example of a detection unit, but a noncontact-type mechanical switch may be used.

Figure 13:
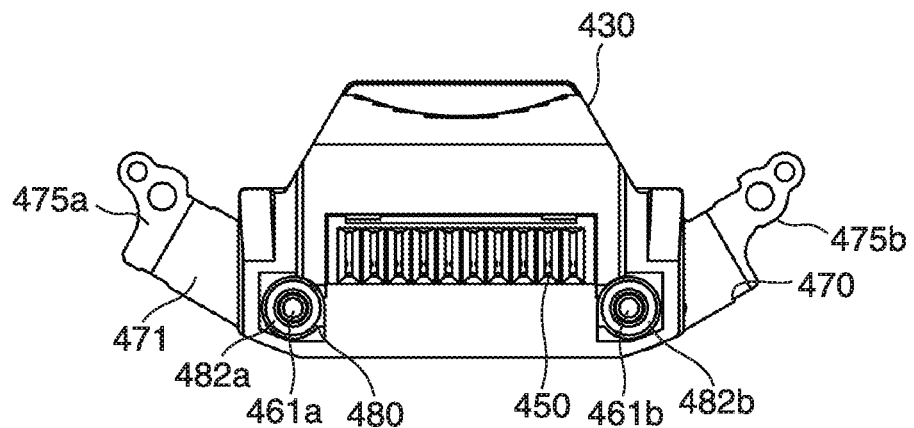
FIG. 13 is a view showing the telecommunication unit of the lens adapter as viewed from behind.

FIG. 13 is a view showing the telecommunication unit 430 of the lens adapter 400 as viewed from behind the camera main body 100. As shown in FIG. 13, metallic screws (not shown) inserted into the screw insertion holes 461a and 461b of the supporting member 460 are fastened to the fixing unit 471 of the holding member 470. At this time, bearing surfaces of heads of the screws are in electric conduction with the pattern exposed portions 482a and 482b of the flexible substrate 480. The screws correspond to exemplary fastening members.

It is preferred that an electric component which suppresses magnetic noise generated from the interchangeable lens 150, an electric component which prevents a large current from accidentally flowing to another substrate (not shown), and so forth are mounted on the flexible substrate 480. These electric components require grounding that is electrically dependent. To provide ground patterns, a method in which the number of wires in electric connecting portions is increased is conceivable, but this complicates structure, increases the size of a unit, and brings about cost increase.

In the present embodiment, as described above, the heads of the screws inserted into the screw insertion holes 461a and 461b of the supporting member 460 are in electric conduction with the pattern exposed portions 482a and 482b of the flexible substrate 480. This enables the flexible substrate 480 to establish a ground through the screws, and electric components are mounted on it with a simple structure and at low cost.

Figure 14:
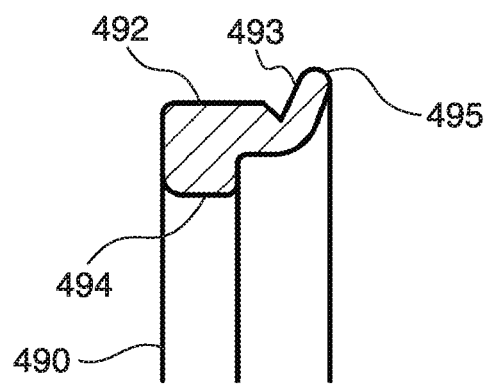
FIG. 14 is a cross-sectional view showing essential parts of an elastic member in a state where the lens adapter is incorporated in the camera main body.
Figure 15:
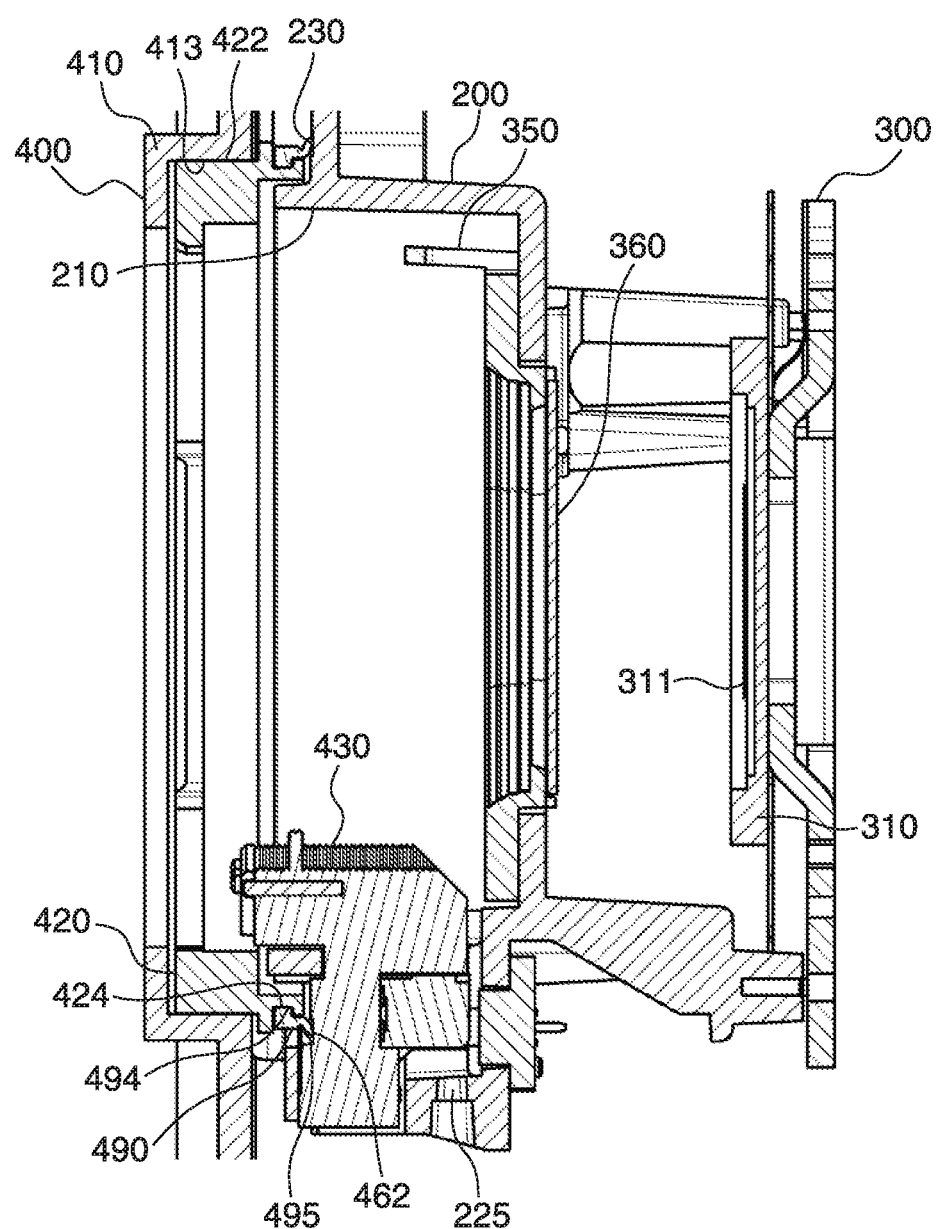
FIG. 15 is a cross-sectional view showing essential parts in a state where the lens adapter is incorporated in the camera main body.

FIG. 14 is a cross-sectional view showing essential parts of the elastic member 490 in a state where the lens adapter 400 is incorporated in the camera main body 100. FIG. 15 is a cross-sectional view showing essential parts in a state where the lens adapter 400 is incorporated in the camera main body 100.

As shown in FIG. 14, the elastic member 490 is shaped like a ring by a first annular portion 492 disposed on a front side and a second annular portion 493 disposed on a rear side. The first annular portion 492 is fitted on the contacting portion 424 of the movable mount member 420. In this fitted state, the first annular portion 492 is deformed with its diameter expanded outwardly in a radial direction, and its inner peripheral portion 494 is fitted on the contacting portion 424 of the movable mount member 420 in a state of being pressed against the contact portion 424 of the movable mount member 420 inwardly in the radial direction.

The second annular portion 493 has a lip portion 495 with its diameter gradually expanding outwardly in a radial direction toward the rear (toward the camera main body 100), and the lip portion 495 is thinner walled than the first annular portion 492. The lip portion 495 is brought into partial contact with and pressed against the arc-shaped contacting portion 462 provided in the supporting member 460 of the telecommunication unit 430 fixed to the fixed mount member 410.

As shown in FIG. 15, the air hole 225 formed in the bottom portion of the fixing member 210 is located in an area with lowest ventilating resistance between the lens adapter 400 and the image pickup device protection unit 350. As a result, when air drift is caused to occur by a focusing action, a zooming action, or the like of the interchangeable lens 150, air flows toward the air hole 225.

More specifically, foreign matter such as dust floating in the area between the lens adapter 400 and the image pickup device protection unit 350 is led to the air hole 225. Here, by placing a cleaning filter, an adhesive agent, or the like in the vicinity of the air hole 225 and causing foreign matter to become attached to the cleaning filter, the adhesive agent, or the like, the foreign matter is prevented from remaining between the lens adapter 400 and the image pickup device protection unit 350.

Figure 16:
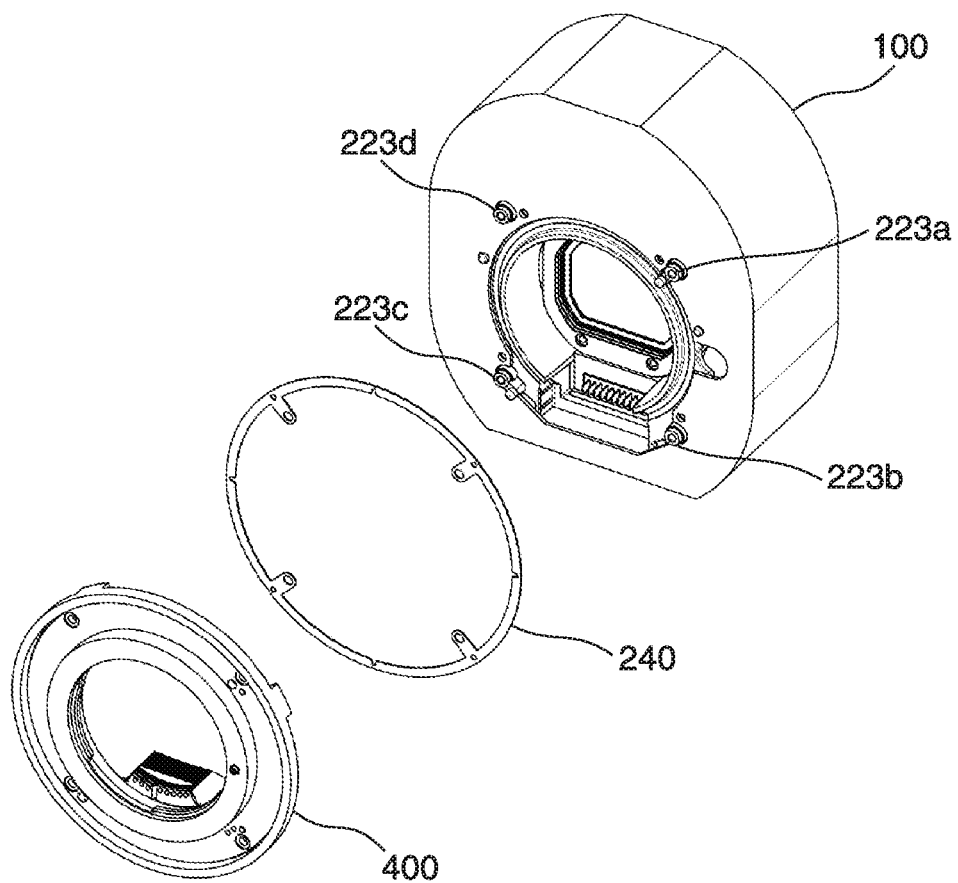
FIG. 16 is a perspective view showing how the lens adapter is mounted on the camera main body via a spacer.

FIG. 16 is a perspective view showing how the lens adapter 400 is mounted on the camera main body 100 via the spacer 240. As shown in FIG. 16, the lens adapter 400 is removably fastened to the fixing portions 223a to 223d, which are provided in the fixing member 210 of the camera main body 100, via the spacer 240 by screws inserted through screw insertion holes 414a to 414d of the fixed mount member 410. It should be noted that means for fixing the lens adapter 400 to the camera main body 100 is not limited to screws, but other fixing means may be used.

Figure 17:
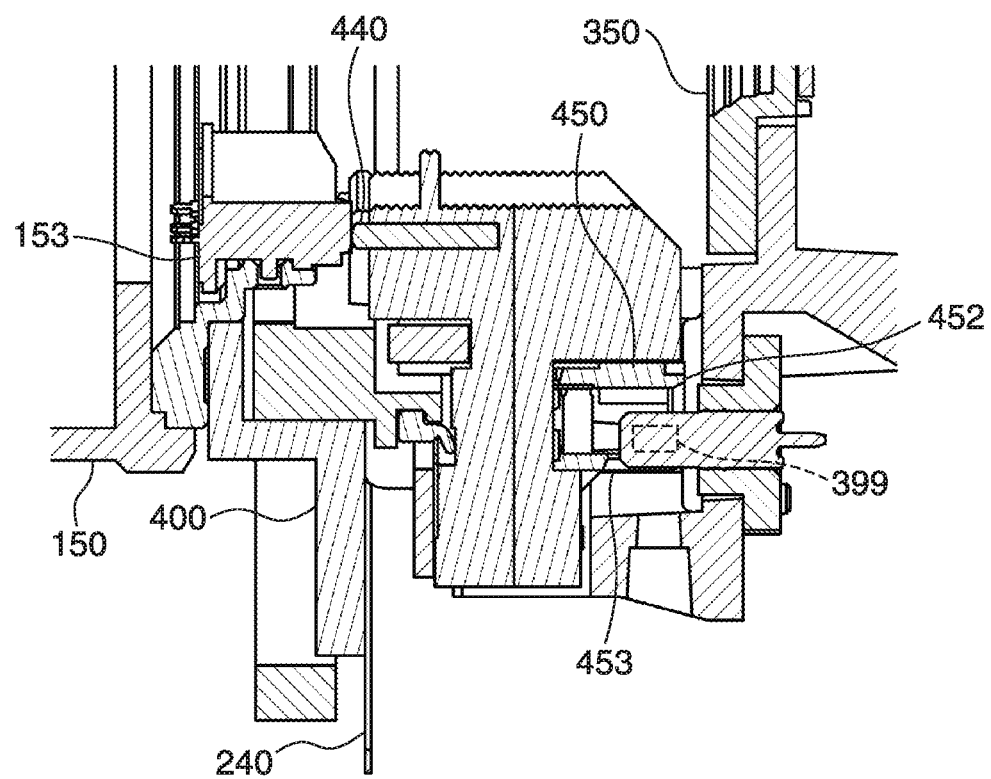
FIG. 17 is a cross-sectional view showing essential parts of the lens adapter in a state where the interchangeable lens is mounted on the lens adapter attached to the camera main body.

FIG. 17 is a cross-sectional view showing essential parts in a state where the interchangeable lens 150 is mounted on the lens adapter 400 attached to the camera main body 100. As shown in FIG. 17, the electric connecting portion 153 of the interchangeable lens 150 is electrically connected to the electric connecting portion 440 of the telecommunication unit 430 of the lens adapter 400. The electric connecting portion 450 of the telecommunication unit 430 of the lens adapter 400 is brought into contact with and electrically connected to the contact portions 262a to 262j of the fixing unit 200 of the camera main body 100 within a range 399 in the figure. This enables electric communication between the interchangeable lens 150 and the camera main body 100.

The openings 451 in the electric connecting portion 450 of the telecommunication unit 430 are substantially L-shaped by the bottom-side openings 452 and the rear-side openings 453 as described earlier, and hence they are placed to cover the range 399 of the contacting portion when the camera main body 100 is seen from above.

As a result, even when foreign matter such as dust floating in the area between the lens adapter 400 and the image pickup device protection unit 350 is deposited, the foreign matter is not accumulated since the contacting portion is covered, and poor electric conduction is unlikely to occur. Also, when foreign matter is led to the air hole 225 by air drift, air drift is unlikely to occur since the range 399 of the contacting portion is covered, and hence poor conduction is unlikely to occur as above.

Figure 18:
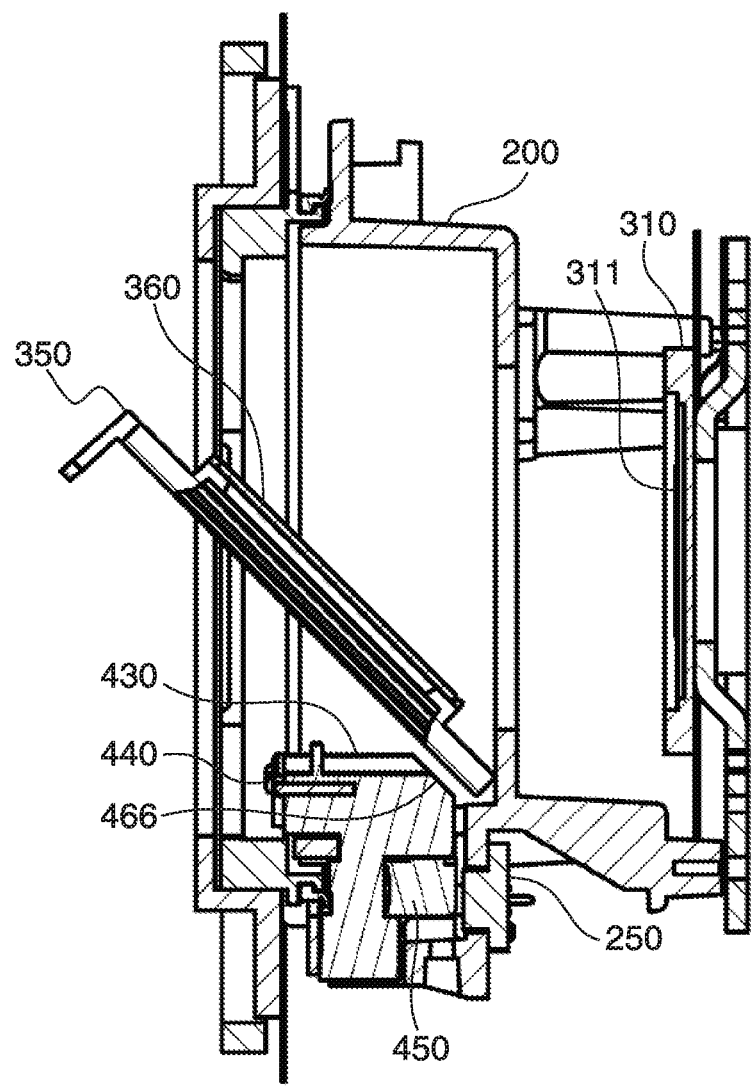
FIG. 18 is a cross-sectional view showing essential parts in a case where the image pickup device protection unit is removed from the fixing unit of the camera main body.

FIG. 18 is a cross-sectional view showing an essential parts in a case where the image pickup device protection unit 350 is removed from the fixing unit 200 of the camera main body 100. When foreign matter becomes attached to the light-incident surface 311 of the image pickup device 310, the foreign matter attached to the light-incident surface 311 is removed by detaching the image pickup device protection unit 350 from the front side of the camera main body 100 as shown in FIG. 18.

As described above, in the present embodiment, the electric connecting portion 450 of the telecommunication unit 430 on the camera main body 100 side is provided outside the electric connecting portion 440 on the interchangeable lens 150 side in the radial direction. Thus, the telecommunication unit 250 of the fixing unit 200 electrically connected to the electric connecting portion 450 is also provided outside the electric connecting portion 440 in the radial direction. Thus, even when the size of an image pickup device is increased, the effective range of the glass member 360 is widened, and the image pickup device protection unit 350 is increased in size, this can be coped with.

As described above, the telecommunication unit 430 according to the present embodiment ensures high reliability of electric connection with a simple structure, and therefore, satisfactory communication between the interchangeable lens 150 and the camera main body 100 is achieved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-071986, filed Mar. 31, 2015 which is hereby incorporated by reference wherein in its entirety.

What is claimed is:

1. A communication unit that is removably fixed to an apparatus main body of an image pickup apparatus and provided in a lens adapter, on which an interchangeable lens is removably mounted, to enable communication between the apparatus main body and the interchangeable lens, comprising:
a first electric connecting unit configured to have a plurality of contact portions that are electrically connected to the interchangeable lens in response to the interchangeable lens being mounted on the lens adapter; and
a second electric connecting unit configured to have a plurality of contact portions that are electrically connected to the apparatus main body in response to the lens adapter being fixed to the apparatus main body,
wherein the plurality of contact portions of said first electric connecting unit is arranged along a mount portion with an annular shape,
wherein the plurality of contact portions of said second electric connecting unit is arranged more linearly than an arrangement of the plurality of contact portions of the first electric connecting unit, and
wherein said second electric connecting unit is disposed outside said first electric connecting unit in a radial direction of the lens adapter, the plurality of contact portions of the second electric connecting unit being constructed as female.

2. The communication unit according to claim 1, wherein the plurality of contact portions of said first electric connecting unit comprise a plurality of pin-shaped terminals, and the plurality of contact portions of said second electric connecting unit comprise terminals having a comb teeth shape.

3. The communication unit according to claim 1, further comprising a detection unit configured to detect whether the interchangeable lens has been mounted on the lens adapter,
wherein said detection unit is disposed outside said first electric connecting unit in a radial direction of the lens adapter.

4. The communication unit according to claim 1, further comprising a substrate configured to electrically connect said first electric connecting unit and said second electric connecting unit together,
wherein said substrate has a pattern exposed portion that is brought into electric conduction with a holding member, which holds the communication unit, via a fastening member, which fastens the communication unit to the holding member, and grounded.

5. The communication unit according to claim 1, further comprising a light-shielding unit configured to diffuse light that is part of subject light incident from the interchangeable lens.

6. A lens adapter that is removably fixed to an apparatus main body of an image pickup apparatus and on which an interchangeable lens is removably mounted, comprising:
a communication unit configured to enable communication between the apparatus main body and the interchangeable lens;
wherein said communication unit comprises a first electric connecting unit that has a plurality of contact portions that are electrically connected to the interchangeable lens in response to the interchangeable lens being mounted on the lens adapter, and a second electric connecting unit that has a plurality of contact portions that are electrically connected to the apparatus main body in response to the lens adapter being mounted on the apparatus main body,
wherein the plurality of contact portions of the first electric connecting unit is arranged along a mount portion with an annular shape,
wherein the plurality of contact portions of said second electric connecting unit is arranged more linearly than an arrangement of the plurality of contact portions of the first electric connecting unit, and
wherein said second electric connecting unit is disposed outside said first electric connecting unit in a radial direction of the lens adapter, the plurality of contact portions of the second electric connecting unit being constructed as female.

7. The communication unit according to claim 1, wherein the lens adapter has a first side on which said first electric connecting unit is arranged and a second side that is an opposite side to the first side and on which said second electric connecting unit is arranged, and wherein said second electric connecting unit is arranged at a position not being exposed to outside in a state in which the lens adapter is mounted on the apparatus main body.

8. The communication unit according to claim 2, wherein the lens adapter and the apparatus main body are electrically connected to each other in a state in which said terminals having the comb teeth shape of said second electric connecting unit contact with terminals having a comb teeth shape constructed as male of the apparatus main body.

* * * * *